J. HIRSHSTEIN.
COUPLING.
APPLICATION FILED FEB. 11, 1918.
1,304,980.
Patented May 27, 1919.
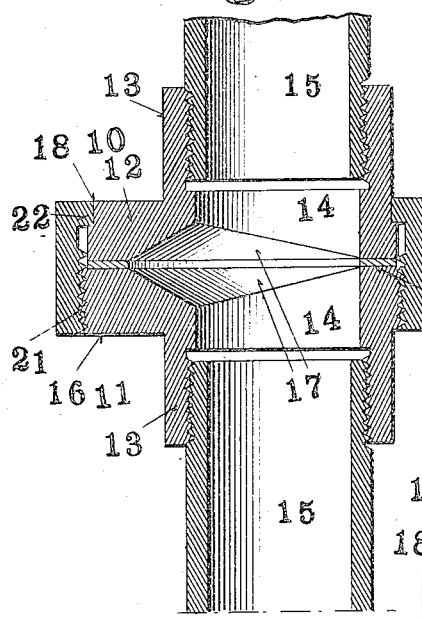
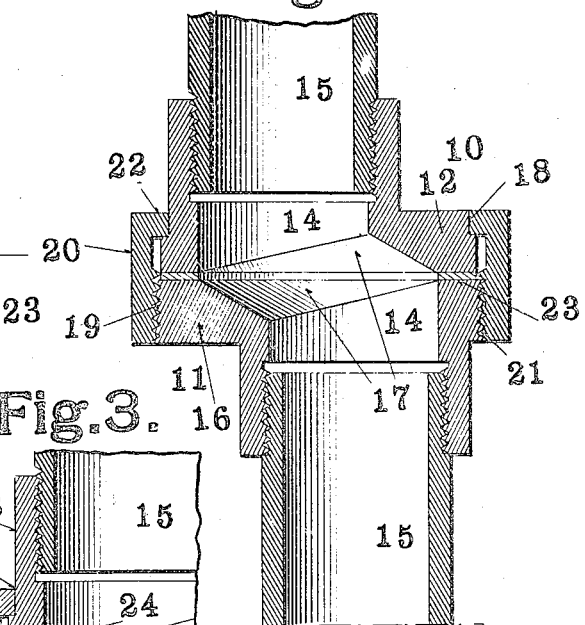
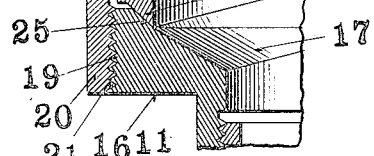
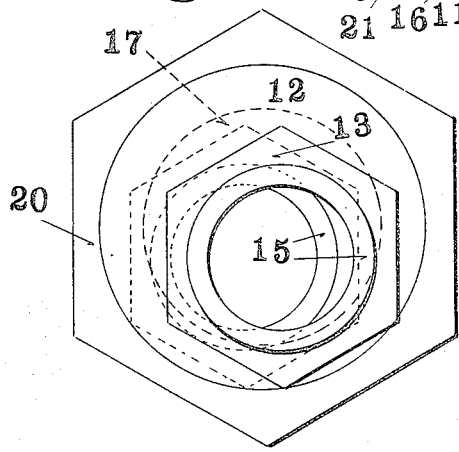
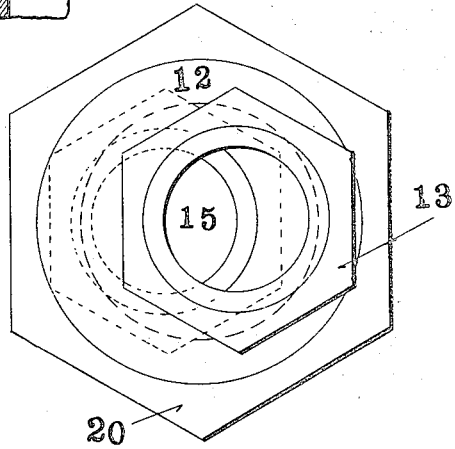
WITNESS
W. H. Alexander.
INVENTOR.
Joseph Hirshstein
BY E. E. Huffman
ATTORNEY.

UNITED STATES PATENT OFFICE.

JOSEPH HIRSHSTEIN, OF ST. LOUIS, MISSOURI.

COUPLING.

1,304,980. Specification of Letters Patent. Patented May 27, 1919.

Application filed February 11, 1918. Serial No. 216,626.

*To all whom it may concern:*

Be it known that I, JOSEPH HIRSHSTEIN, a citizen of the United States of America, residing at the city of St. Louis, State of Missouri, United States of America, have invented a certain new and useful Coupling, of which the following is such a full, clear, and exact description as will enable any one skilled in the art to which it appertains to make and use the same, reference being had to the accompanying drawings, forming part of this specification.

My invention relates to coupling means for making connections between two pipes or other parts in situations where the parts are not in such alinement as to permit the use of standard couplings. My invention relates particularly to an improvement upon the form of coupling shown and described in my former application, Serial No. 213,115, filed January 22, 1918.

In the accompanying drawings, which illustrate one embodiment of my invention, Figure 1 is a vertical section; Fig. 2 is a view similar to Fig. 1, showing the parts in a different position; Fig. 3 is a detailed sectional view showing a slight modification; Fig. 4 is a top plan view showing the parts in one position; and Fig. 5 is a top plan view showing the parts in another position.

The coupling proper consists of two members 10 and 11, which are held together end to end so as to be relatively rotatable. The member 10 consists of a part 12, which is concentric to the axis of relative rotation of the members and of a part 13, which is eccentric to said axis and is provided with an internally threaded opening 14 adapted to engage with one of the pipes 15 to be connected. The member 11 is provided with a part 16 concentric with the axis of relative rotation of the parts, and with a part 13, similar to the part 13 carried by the member 10 and like it provided with an internally threaded opening 14 for engagement with one of the pipes 15 to be connected. Each of the openings 14 extend through the part in which it is formed and is provided at the inner end with a lateral extension 17 so shaped that the inner end of the opening is concentric with the axis of relative rotation, and consequently the inner ends of the openings are in alinement in all positions of the members.

Any suitable means may be used to hold the members 10 and 11 together end to end so that they may be relatively rotated. In the particular embodiment of my invention shown in the drawings I provide the periphery of the part 12 with a recess 18, and form upon the periphery of the parts 16 threads 19. A member 20, which is adapted to surround the parts 12 and 16, I provide with threads 21 for engaging with the threads 19 on the parts 16, and with a flange 22 for engaging the annular recess 18 of the part 12. The member 20 I preferably make hexagonal, as shown in Figs. 4 and 5 of the drawings, so that it may be engaged by a wrench. The parts 13 are also preferably made hexagonal, as shown in these views of the drawings, for the same purpose. Any suitable means may be used to form a tight joint between the meeting ends of the members 12 and 16. In Figs. 1 and 2 of the drawings I have shown these ends as made flat and having interposed between them a washer 23 of any suitable yielding material. In Fig. 3 of the drawings I have shown a ground joint in which the part 12 is provided with a conical projection 24, and the part 16 with a corresponding recess 25.

The manner of using my coupling will be evident. The pipes 15 to be connected are first screwed into the threaded openings 14, and the parts 12 and 16 are then brought together and turned to such position that the said parts will be concentric. If the pipes 15 are in alinement the relative position of the member will be as shown in Fig. 1 of the drawings. If they are out of alinement the member will assume a position similar to that shown in Fig. 2 of the drawings, in which the coupling is adjusted to its extreme limit of eccentricity. Fig. 5 of the drawings shows a top view of the parts in this position; while Fig. 4 illustrates an intermediate position where the amount of eccentricity is less. After the parts 12 and 16 have been brought into proper position the member 20 is placed around the parts 12 and 16, with the threads 21 engaging with the threads 19, and the said part is screwed up firmly to connect the two members end to end, thus forming a tight joint. It will be evident that by the use of my improved form of coupling pipes may be readily connected whether in or out of proper alinement.

Having fully described my invention, what I claim as new and desire to secure by Letters Patent of the United States is:

1. A coupling for parallel nonalined parts, comprising two relatively rotatable members, means for securing said members together end to end, each of said members being provided with a connecting portion eccentric to the axis of relative rotation of the said members, the axis of said connecting portion being parallel with the axis of relative rotation.

2. A coupling for parallel nonalined parts, comprising two relatively rotatable members, each having a part concentric with the axis of relative rotation and a connecting part eccentric to said axis, the axis of said eccentric part being parallel with the axis of relative rotation, and a third member engaging with said concentric parts to hold the members together.

3. A coupling for parallel nonalined parts, comprising two relatively rotatable members, each having a part concentric with the axis of relative rotation and a connecting part eccentric to said axis, the axis of said eccentric part being parallel with the axis of relative rotation, and a third member surrounding and engaging with said concentric parts to hold the members together.

4. A coupling for parallel nonalined parts, comprising two relatively rotatable members, each having a part concentric to the axis of relative rotation and a connecting part eccentric thereto, the axis of said eccentric part being parallel with the axis of relative rotation, and a third member surrounding said concentric parts and having threaded connection with one of said parts.

5. A coupling for parallel nonalined parts, comprising two members relatively rotatable, each having a part concentric to the axis of relative rotation and an opening eccentric to said axis, the axis of said opening being parallel to the axis of relative rotation, and means for securing said parts together end to end.

In testimony whereof I have hereunto set my hand and affixed my seal.

JOSEPH HIRSHSTEIN. [L. S.]